US006801540B1

United States Patent
Jeong

(10) Patent No.: US 6,801,540 B1
(45) Date of Patent: Oct. 5, 2004

(54) INTERNET PHONE-BASED PRIVATE EXCHANGE AND CALL SIGNAL EXCHANGING METHOD THEREOF

(75) Inventor: Man Su Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 853 days.

(21) Appl. No.: 09/633,167

(22) Filed: Aug. 4, 2000

(51) Int. Cl.[7] .................................................. H04J 3/16
(52) U.S. Cl. ....................................... 370/466; 370/352
(58) Field of Search ............................... 370/466, 353, 370/354, 401, 352

(56) References Cited

U.S. PATENT DOCUMENTS 6,674,746 B1 * 1/2004 Lamarque, III ............. 370/352

* cited by examiner

Primary Examiner—Douglas Olms
Assistant Examiner—Robert W. Wilson
(74) Attorney, Agent, or Firm—Birch, Stewart, Kolasch & Birch, LLP

(57) ABSTRACT

An internet phone-based private exchange and a call signal exchanging method thereof employing a network protocol unit, a call signal detecting/determining unit, a call converting unit which matches a protocol of the call signal from the call transmitting terminal with a protocol of a call signal supporting a receiving terminal which is to be connected by the call transmitting terminal when the protocol of the call signal of the call transmitting terminal and that of the receiving terminal are different, and a task managing unit which inputs the call signals of the call transmitting terminals from the gate keepers and transmits IP addresses of the receiving terminals which are to be connected by the call transmitting terminals to the terminal gate keepers.

18 Claims, 6 Drawing Sheets

FIG. 3

| INTER-PHONE NO. | IP ADDRESS | | PROTOCOL OF REAL TERMINAL | RING GROUP |
|---|---|---|---|---|
| | REAL TERMINAL | VIRTUAL TERMINAL | | |
| 101 | A | 1 | H.323 | 526-4101 |
| 102 | B | 2 | H.323 | 526-4101 |
| 103 | C | 3 | PROPERTY | 526-4101 |
| 104 | D | 4 | PROPERTY | 526-4102 |
| 105 | E | 5 | PROPERTY | 526-4102 |

REAL TERMINAL IP ADDRESSES : A, B, C, D AND E

VIRTUAL TERMINAL IP ADDRESSES : 1, 2, 3, 4 AND 5

INTERNET PHONE-BASED PRIVATE EXCHANGE AND CALL SIGNAL EXCHANGING METHOD THEREOF

BACKGROUND OF THE INVENTION

1. Field of the Invention

The present invention relates to an private exchange and a call signal exchanging method thereof, in particular to an internet phone-based private exchange and a call signal exchanging method thereof which is capable of communicating between terminals supporting different protocols in a local area network, and communicating any terminal connected with the local area network and a terminal connected with PSTN.

2. Description of the Prior Art

In general, an office according to prior art has two networks which are connected with Private Branch Exchange (PBX) system to support telephone communication and a network facility to support data communication. Accordingly, the office has problems occurred by the conventional networks as below.

First, both telephone line connected to a private exchange for audio communication and LAN (Local Area Network) cable connected to LAN for data communication are separately led-in and installed, and the two communication lines are allotted to one user, accordingly lots of installation cost and plenty of time for wiring work are required.

In addition, later installing additionally more private exchanges is difficult because private exchanges adopt different exchange methods according to its manufacturer, when the office is moved to other place, changing information of the private exchange is difficult because the private exchange has to be set by manual operation in accordance with installation place.

Accordingly, double management costs are required because the each communication apparatus has to be kept separately in order to perform voice communication and audio communication.

Second, there are lots of limitations to determine switching capacity and switching speed of the conventional private exchange adopting a circuit switching method which converts audio signals into time slots, allots it to communication channel, and transmits the time slots through a memory buffer, and there are lots of limitations to determine switching speed of the conventional private exchange which adopts a HDLC method aside from audio communication.

In addition, the conventional private exchange has complicated structure and control software because audio signal channel and data signal channel are duplicated, and it is mainly for audio communication, accordingly interlocking with other data communication apparatus performing multimedia through internet is difficult.

Third, on the basis of the conventional technology, in order to reduce telephone bill, a company hires telephone leased-line for telephone call and international call between a headquarter and branches by paying a certain amount of money every month.

In addition, in order to connect to internet, WAN (Wide Area Network) is constructed between the headquarter and the branches, the headquarter is connected to an ISP (Internet Service Provider) which provides internet leased-lines, and the branches are connected to internet by paying a certain amount of money every month.

Accordingly, the company has to install and maintain leased-lines doubly, and has to pay the bill doubly.

However, traffic on the telephone leased-line is very light except a certain busy time zone, and there is a way to perform audio communication not using the telephone leased-line but routing audio communication through WAN for connecting internet, accordingly the company can reduce the communication bill.

In the latest communication technologies, a private exchange adopting the conventional circuit switching method is replaced with an IP based private exchange, accordingly calling telephone through Internet is possible.

The IP based private exchange can communicate on the basis of H.323 standard call control presented by ITU-T as an international standard, and makes terminals correspond-ing to H.323 protocol communicate.

The H.323 protocol is a communication protocol which makes terminals having CODEC for processing audio signals and video signals communicate each other through internet, it requires 15~20 seconds for call connection and makes terminals placed at two points (point to point) communicate.

Accordingly, the IP based private exchange managing traffic on LAN or internet requires a property protocol which spends short time for call connection, holds status information of PSTN and terminals in common inside of a group, and reduces traffic by multicasting the status information to other terminals.

Meanwhile, because the conventional private exchange and the IP based private exchange control calls by a central studio system, when all call requests are transmitted to the IP based private exchange, the private exchange connects or ends the calls in accordance with the status of the terminal, and the IP based private exchange makes only IP terminals reach each other internally or makes PSTN call reach when the IP based private exchange is connected to the private exchange.

When the terminals and the private exchange are made so as to have a distributed call control method processing each call by itself, the terminals and the private exchanges can be easily installed, and failures to be occurred are distributed, accordingly the terminals and the private exchanges can be installed and maintained stably.

In the distributed call control method, a certain terminal or private exchange informs its information to the other terminal or the other private exchange within broadcasting extent by transmitting its ID through IP network.

After, all status information related to calls is changed on the terminal or the private exchange, and the changed status information is multicast as a message pattern.

The other terminal or the other private exchange receiving the multicast message renews status information of the terminal and the private exchange stored before, and at the same time displays the received status information on a display unit such as a LED or a LCD.

However, speech quality of the terminal adopting the distributed call control method lowers during telephone-talk because the terminal has to receive status information from a plurality of terminals or private exchange while it is busy.

SUMMARY OF THE INVENTION

It is an object of the present invention to provide an internet phone-based private exchange and a call signal exchanging method thereof which is capable of supporting local area network communication between terminals when terminals having different protocol are connected each other, and supporting external communication between the terminals and terminals connected to external PSTN.

To achieve above object, an internet phone-based private exchange comprises a network protocol unit which inputs call signals transmitted from call transmitting terminals connected to local area network and processes the call signals at a real time, a call signal detecting/determining unit which detects the call signals outputted from the network protocol unit and determines protocol types of the call signals of the call transmitting terminals, terminal gate keepers which make possible communication between terminals supporting protocol of the call transmitting terminals through the network protocol unit, a call converting unit which is connected to the terminal gate keepers and matches a protocol of the call signal generated from the call transmitting terminal with a protocol of a call signal supporting a receiving terminal which is to be connected by the call transmitting terminal when the protocol of the call signal of the call transmitting terminal and that of the receiving terminal are different, and a task managing unit which inputs the call signals of the call transmitting terminals from the gate keepers and transmits IP addresses of the receiving terminals which are to be connected by the call transmitting terminals to the terminal gate keepers.

In order to achieve above object, a call signal exchanging method of a private exchange based on internet phone comprises the steps of detecting a call signal transmitted from a call transmitting terminal and determining protocol of the call, matching the protocol of the call protocol with protocol of a call supported by a call receiving terminal when the protocol supported by the call transmitting terminal and the protocol supported by the receiving terminal are different, and transmitting the call signal from the call transmitting terminal to the receiving terminal.

In order to achieve above object, a call signal exchanging method of a private exchange based on internet phone comprises the steps of judging whether a call signal generated by a first call transmitting terminal is to be connected to local area network or to be connected to PSTN, and transmitting the call signal to the PSTN when the call signal is for being connected to the PSTN.

In order to achieve above object, a call signal exchanging method of a private exchange based on internet phone comprises the steps of searching whether a first receiving terminal corresponding to a call signal is registered on a memory after being inputted the call signal received from a PSTN, and transmitting the call signal to the first receiving terminal when the first receiving terminal is registered on the memory.

BRIEF DESCRIPTION OF THE DRAWINGS

FIG. 3 is a look-up table illustrating terminal information stored on a memory of an internet phone-based private exchange of the present invention.

DETAILED DESCRIPTION OF THE PREFERRED EMBODIMENT

Figure 1:
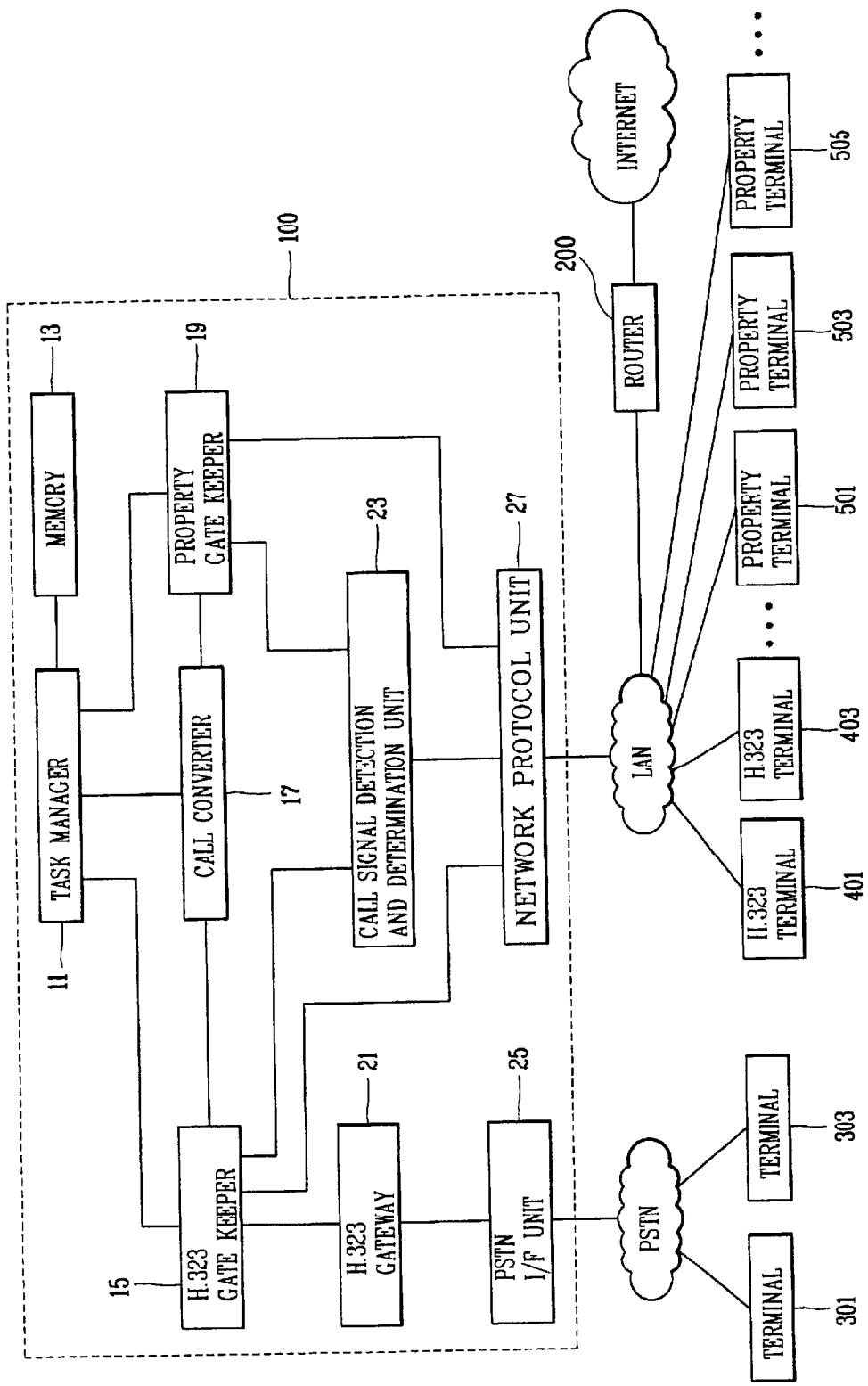
FIG. 1 is a block diagram of network for an internet phone-based private exchange the present invention.

FIG. 1 is a block diagram of network for private exchange based on internet phone of the present invention. It comprises a private exchange 100 which converts protocol of call signals originated from terminals, stores IP address and status information of the terminals, and performs call control or additional functions, and a router 200 which connects local area network to leased-network in order to make possible communication between a certain terminals 301, 303, . . . connected to PSTN, H.323 terminals 401, 403, . . . and property terminal 501, 503, 505, . . . connected to local area network or LAN, terminals 401, 403, . . . , 501, 503, 505, . . . connected to the local area network or LAN, and terminals 301, 303, . . . connected to PSTN.

Herein, the private exchange 100 comprises a network protocol unit 27 which is inputted call signals from H.323 terminals 401, 403 connected to local area network (or LAN) and property terminals 501, 503 and 505 supporting property protocol set in advance and processes the call signals at real time, a call signal detecting/determining unit 23 which detects call signals processed/outputted from the network protocol unit 27 and determines whether protocol of an call transmitting terminal generating the call signal is H.323 protocol or property protocol, a H.323 gate keeper 15 which is activated in order to receive a message from a H.323 terminal when the call signal is a terminal supporting H.323 protocol, a property gate keeper 19 which is activated in order to receive a message from the property terminal when the call signal is a terminal supporting the property protocol, a call converter 17 which receives a call signal originated form the H.323 protocol or the property terminal and converts the H.323 protocol of the call signal into the property protocol or the property protocol of the call signal into the H.323 protocol when the H.323 terminal is connected to the property terminal or the property terminal is connected to the H.323 terminal between the H.323 gate keeper 15 and the property gate keeper 19, a task manager 11 which is inputted the call signals outputted from the H.323 gate keeper or the property gate keeper 19 and transmits address of a receiving of itself terminal or the H.323 terminal corresponding to the H.323 terminal or the property terminal to the H.323 gate keeper 15 or the property gate keeper 19, and a memory which stores information about the H.323 terminals 401, 403, . . . , the property terminal 501, 503, 505, . . . and the call converter 17.

In addition, a H.323 gate way 21 which converts a PSTN signal into a H.323 signal and converts on the contrary is comprised in order to make the H.323 terminals 401, 403, . . . and the property terminal 501, 503, 505, . . . connected to local area network communicate to the terminals connected to external PSTN, and an office interface unit 25 which is inputted a PSTN signal from PSTN and transmits it to the H.323 gate way 21 or is inputted a call signal from the H.323 gate way 21, generates a DTMF signal corresponding to the call signal and transmits it to a terminal connected to the PSTN is comprised.

In the private exchange of the present invention, the terminals connected to the private exchange have to be registered in advance.

The registering process and communicating process between the terminals connected to local area network will now be described with reference to accompanying drawings.

Figure 2:
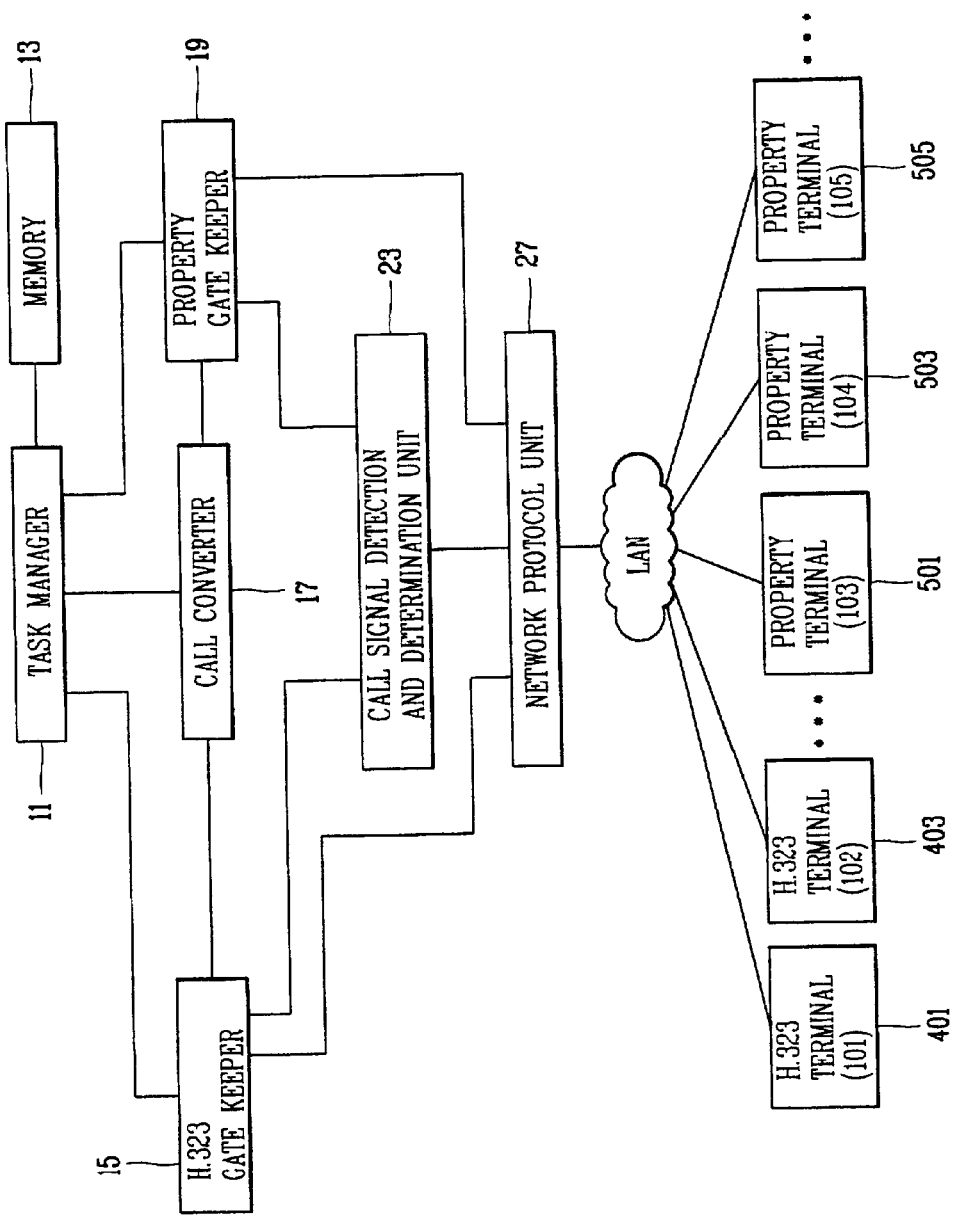
FIG. 2 is a block diagram illustrating circuit units for internal register and local area network communication of an internet phone-based private exchange of the present invention.

FIG. 2 is a block diagram illustrating circuit units for internal register and local area network communication of a private exchange of the present invention.

As depicted in FIG. 2, when a certain terminals such as the H.323 terminal having interphone number 101 and the H.323 terminal having interphone number 102, the property terminal 501 having interphone number 103, the property terminal 503 having interphone number 104 and the property terminal 503 having interphone number 105 are connected to the private exchange 100 of the present invention, As depicted in FIG. 3, information about the terminals are stored on the memory 13 of the private exchange 100 as a look-up table form.

Immediately the terminals 401, 403, 501, 503, 505 transmit call signal to the call signal detection and determination unit 23 through the network protocol unit 27. And, the call signal detection and determination unit 23 detects the call signal and determines protocol type supported by the terminal generating the call signal and transmits the call signal originated from the call transmitting terminal to the H.323 gate keeper or the property gate keeper corresponding to the protocol supported by the terminal.

The task manager 11 stores information about the terminal generating the call signal such as interphone number, IP address (for example, A, B, C, D and E) and protocol type of the terminal (for example, H.323 protocol or set property protocol) on the memory 13 in accordance with the call signal outputted from the H.323 gate keeper or the property gate keeper.

In addition, the private exchange 100 of the present invention converts the protocol supported by the terminal into a protocol supported by the other terminal and stores information about the call converter 17 making possible communication between the terminals having different protocols such as IP address (1, 2, 3, 4 and 5) of virtual terminal corresponding to the IP address of the real terminal on the memory 13.

Meanwhile, the private exchange 100 of the present invention stores interphone numbers (526-44101 and 526-4102) allotted to the terminals on the memory 13.

Herein, the each terminal has each different interphone number or a certain terminals ({101, 102 and 103}) or ({104 and 105}) have a same interphone number ({526-4101 }) or ({526-4102}).

Accordingly, when the terminal connected to external PSTN transmits a call signal in order to be connected to a certain terminal corresponding to a certain interphone number, the terminal corresponding to a certain interphone number outputs bell-tone to a user, when a group of terminals is corresponding to the interphone number, the terminals included in the group output bell-tones at the same time.

Figure 4:
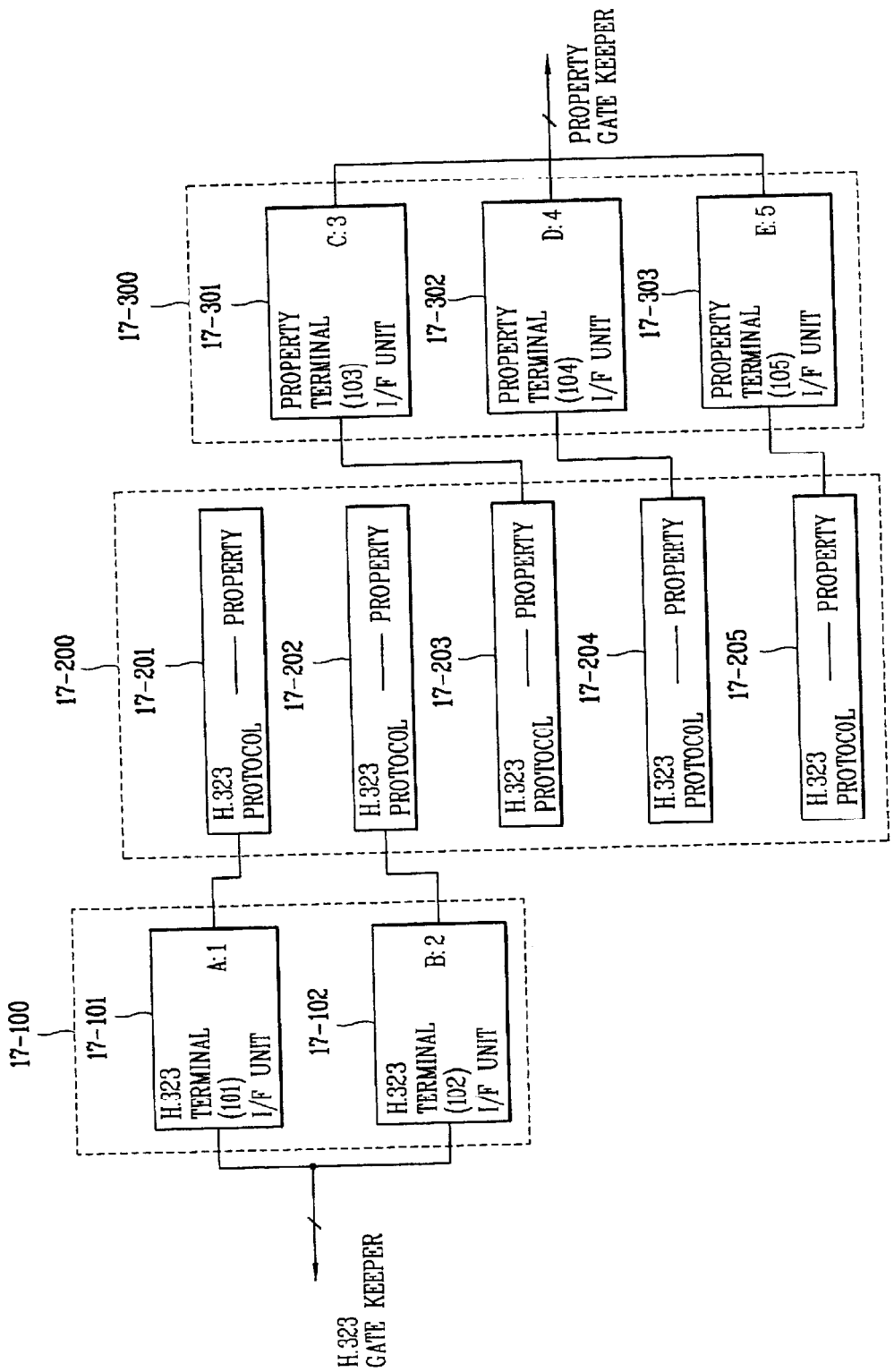
FIG. 4 is a block diagram illustrating a call converting unit of an internet phone-based private exchange of the present invention.

FIG. 4 is a block diagram illustrating a call converting unit of a private exchange of the present invention. It comprises a first interface unit 17-100 which is connected to the H.323 terminals 401 and 403 supporting H.323 protocol, a second interface unit 17-300 which is connected to the property terminals 501, 503 and 505 supporting property protocol, and a protocol matching unit 17-200 which makes possible communication between the terminals 401, 403, 501, 503 and 505 by matching protocol of the terminals 401 and 403 connected to the first interface unit 17-100 and protocol of the terminals 501, 503 and 505 connected to the second interface unit 17-300 between the first interface unit 17-100 and the second interface unit 17-200.

Herein, the first interface unit 17-100 includes a first H.323 terminal interface unit 17-101 and a second H.323 terminal interface unit 17-102 having respectively IP addresses 1 and 2 of virtual terminals in order to convert H.323 protocol into property protocol on the protocol matching unit 17-200.

The second interface unit 17-300 connected to the property gate keeper includes a first property terminal interface unit 17-301, a second property terminal interface unit 17-302 and a third property terminal interface unit 17-303 which respectively have IP addresses 3, 4 and 5 of virtual terminals in order to convert property protocol into H.323 protocol on the protocol matching unit 17-200.

In addition, the protocol matching unit 17-200 includes terminal protocol matching units 17-201, 17-202, 17-203, 17-204 and 17-205 which are separately connected to the H.323 terminal interface units and the property interface units and converts H.323 protocol and property protocol.

Immediately, the first H.323 terminal interface unit 17-101 is connected to the first terminal protocol matching unit 17-201, and the second H.323 terminal interface unit 17-102 is connected to the second terminal protocol matching unit 17-202.

In addition, the first property terminal interface unit 17-301 is connected to the terminal protocol matching unit 17-203, the second property terminal interface unit 17-302 is connected to the fourth terminal protocol matching unit 17-204, and the third property terminal interface unit 17-303 is connected to the fifth terminal protocol matching unit 17-205.

Accordingly, the number of the terminal protocol matching units included in the protocol matching unit 17-200 of the call converting unit 17 are same with number of the terminal interface units 17-101, 17-102, 17-301, 17-302, and 17-303.

Herein, the terminal protocol matching units adjacent to the interface units are connected internally, for example, the first H.323 terminal interface unit 17-101 connected to the first the terminal protocol matching unit is connected to the first, the second and the third property terminal interface units 17-301, 17-302 and 17-303 connected to the third, the fourth and the fifth the terminal protocol matching units.

As described above, after the terminals connected to local area network and the call converting unit are registered on the memory, internal calling process between the terminals will perform.

First, calling process between the terminals supporting same protocol will now be described.

As depicted in FIG. 2, when the H.323 terminal 401 transmits a call signal through the network protocol unit 27 in order to be reached to the H.323 terminal 403 supporting same protocol with the H.323 terminal 401, the call signal detection and determination unit 23 detects the call signal outputted from the network protocol unit 27 and activates the GH.323 gate keeper 15.

The task manager 11 inputted the call signal transmitted from the H.323 gate keeper 15 transmits the status and IP address B of the receiving terminal corresponding to the call transmitting terminal to the H.323 gate keeper 15 by referencing the memory 13, the H.323 gate keeper 15 transmits a ring signal to the H.323 terminal through the network protocol unit 27.

Accordingly, the H.323 terminal 401 can be reach to the H.323 terminal 403.

Meanwhile, as well as telephone calling between the H.323 terminals, the property terminals can be reached each other through the property gate keeper 19.

Second, calling process between the terminals supporting different protocol will now be described.

As depicted in FIG. 2, when the H.323 terminal 401 transmits a call signal through the network protocol unit 27 in order to be reached to the property terminal 501 supporting different protocol with the H.323 terminal 401, the call signal detection and determination unit 23 detects the call signal outputted from the network protocol unit 27 and activates the H.323 gate keeper 15.

The task manager 11 judges protocol type of the receiving terminal corresponding to the call transmitting terminal to the H.323 gate keeper 15 by referencing the memory 13, and transmits IP address 3 and status of virtual terminal of the property terminal when the protocol of the receiving terminal is not the protocol of the H.323 terminal but the property protocol supporting the property terminal.

The call converter 17 which receives IP address 3 of virtual terminal from the H.323 gate keeper 15, converts the H.323 protocol of the call signal originated from the H.323 terminal into the property terminal through the terminal protocol matching unit 17-201 and the terminal interface unit 17-302, and transmits the converted call signal to the property gate keeper 19.

The gate keeper receiving the call signal converted into the property protocol transmits a ring signal to the property terminal corresponding to it through the network protocol unit 27. Accordingly, the H.323 terminal 401 can be reached to the property terminal 501 through the call converting unit.

As described above, as same as the calling process between the H.323 terminal and the property terminal. The property terminal can be reached to the H.323 terminal through the call converting unit.

Figure 5:
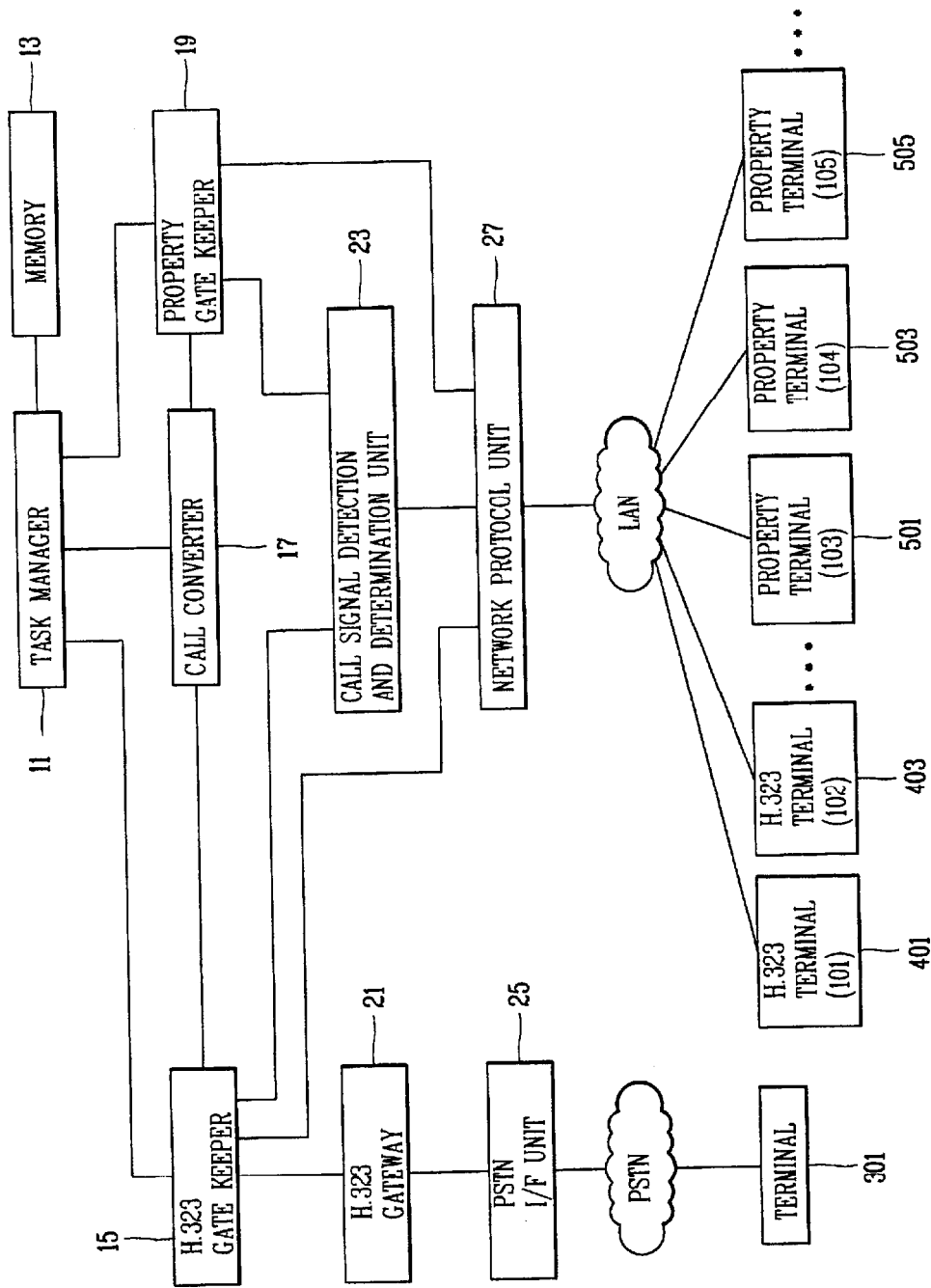
FIG. 5 is a block diagram illustrating circuit units of an internet phone-based private exchange of the present invention for making the terminals connected to a local are network communicate to the terminals connected to PSTN.

FIG. 5 is a block diagram illustrating circuit units of a private exchange of the present invention in order to make terminals connected to local area network communicate to the terminals connected to PSTN.

When the H.323 terminal originates a call signal and transmits it to the call signal detection and determination unit 23 through the network protocol unit 27 in order to connect to the terminal 301 connected to external PSTN, the call signal detection and determination unit 23 judges the call signal whether it is transmitted to the terminal 301 connected to external PSTN, and transmits the call signal to the H.323 gate keeper 15.

The H.323 gate keeper 15 transmits the call signal of the H.323 protocol to the terminal 301 connected to external PSTN through the H.323 gate way 21 and the PSTN interface unit 25.

Accordingly, the H.323 terminal 401 can be reached to the terminal 301 connected to PSTN.

Meanwhile, when the property terminal transmits a call signal to the call signal detection and determination unit 23 in order to be reached to the terminal 301 connected to PSTN, the call signal detection and determination unit 23 judges whether the call signal is transmitted to the terminal 301 connected to external PSTN, and transmits the call signal to the property gate keeper 19.

The property gate keeper 19 transmits the call signal of the property protocol to the call converting unit, the call converting unit converts the call signal of the property protocol into the call signal of the H.323 protocol, and transmits it to the terminal 301 connected to external PSTN through the H.323 gate keeper 15, the H.323 gate way 21 and the PSTN interface unit 25.

Accordingly, the property terminal can be reached to the terminal connected to PSTN.

Figure 6:
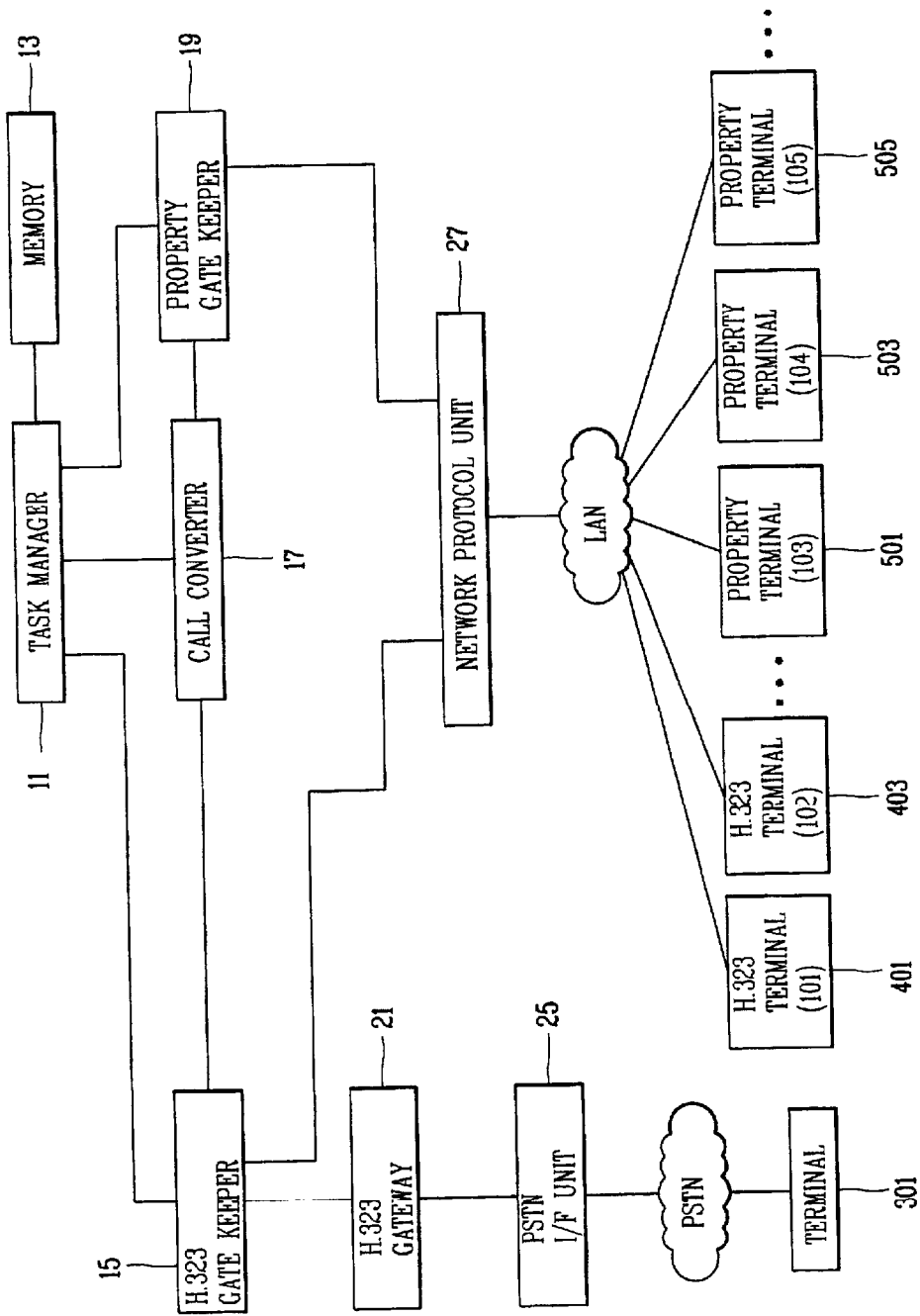
FIG. 6 is a block diagram illustrating circuit units of an internet phone-based private exchange of the present invention for making the terminals connected to PSTN communicate to the terminals connected to local are network.

FIG. 6 is a block diagram illustrating circuit units of a private exchange of the present invention in order to make external terminals communicate to the terminals connected to local are network.

As depicted in FIG. 3, when the terminal 301 connected to PSTN inputs a PSTN signal 526-4101 through the private exchange of the present invention in order to be reached to the H.323 terminal connected to local area network, the PSTN interface unit 25 is inputted the PSTN signal and transmits it to the H.323 gate way 21.

The H.323 gate way 21 converts the PSTN signal into the H.323 signal, and transmits it to the H.323 gate keeper 15.

The task manager 11 is inputted the H.323 signal transmitted from the H.323 gate keeper 15, and transmits IP address of the terminals corresponding to the H.323 signal to the H.323 gate keeper 15.

As depicted in FIG. 3, when the IP address of the terminals is a ring group, about the terminals supporting the H.323 protocol, the H.323 gate keeper transmits a ring signal to the H.323 terminals 401, 403 through the network protocol unit 27, at the same time about the terminals supporting the property protocol, the H.323 gate keeper 15 converts the ring signal of the H.323 protocol into the property protocol, and transmits it to the property gate keeper. And the property gate keeper transmits the ring signal to the property terminal 501 through the network protocol unit 27.

Accordingly, the terminal 301 connected to external PSTN can be reached to the H.323 terminal or the property terminal through the private exchange of the present invention regardless of supporting protocol types.

The apparatus and method for the private exchange based on internet phone of the present invention is capable of supporting local area network communication between terminals when terminals having different protocol are connected each other, and supporting external communication between the terminals and terminals connected to external PSTN.

What is claimed is:

1. An internet phone-based private exchange (IP-based PBX), comprising:
    a network protocol unit which inputs call signals transmitted from call transmitting terminals connected to local area network and processes the call signals at a real time;
    a call signal detecting/determining unit which detects the call signals outputted from the network protocol unit and determines protocol types of the call signals of the call transmitting terminals;
    terminal gate keepers which make possible communication between terminals supporting protocol of the call transmitting terminals through the network protocol unit;
    a call converting unit which is connected to the terminal gate keepers and matches a protocol of the call signal generated from the call transmitting terminal with a protocol of a call signal supporting a receiving terminal which is to be connected by the call transmitting terminal when the protocol of the call signal of the call transmitting terminal and that of the receiving terminal are different; and
    a task managing unit which inputs the call signals of the call transmitting terminals from the gate keepers and transmits IP addresses of the receiving terminals which are to be connected by the call transmitting terminals to the terminal gate keepers.

2. The IP-PBX according to claim 1, wherein the task manager further comprises a memory which stores information of the call transmitting and the call receiving terminals connected to the local area network and of the call converting unit, as a look-up table.

3. The IP-PBX according to claim 2, wherein the look-up table comprises inter-phone number field of the call transmitting and the call receiving terminals, IP address field of the call transmitting and the call receiving terminals, call protocol type field supported by the call transmitting and the call receiving terminals, and ring group field of the call transmitting and the call receiving terminals.

4. The IP-PBX according to claim 3, wherein the IP address field of the call transmitting and the call receiving terminals comprises, IP address field of the call transmitting and the call receiving terminals (real terminals) connected to the local area network, and IP address field of virtual terminals which correspond to the call transmitting and the call receiving terminals at the call converting unit.

5. The IP-PBX according to claim 1, wherein the call converting unit comprises:
a first interface unit which is connected with a first gatekeeper supporting a first protocol;
a second interface unit which is connected to a second gatekeeper supporting a second protocol which is different from the first protocol supported by the first gatekeeper; and
a protocol matching unit which matches the first protocol with the second protocol and makes possible communication between the call transmitting and receiving terminals.

6. The IP-PBX according to claim 5, wherein the first and the second interface units comprise a plurality of terminal interface units connected to the call transmitting and receiving terminals through the network protocol unit and the gatekeeper.

7. The IP-PBX according to claim 6, wherein the plurality of terminal interface units are virtual terminals and allocated with IP addresses.

8. The IP-PBX according to claim 5, wherein the protocol matching unit comprises a plurality of terminal protocol matching units which are connected to the plurality of terminal interface units, respectively.

9. The IP-PBX according to claim 1, wherein the call transmitting and the call receiving terminals are terminals supporting H.323 protocol or property protocol.

10. The IP-PBX according to claim 1, wherein the terminal gate keepers are H.323 gate keeper supporting H.323 protocol and property gate keeper supporting a property protocol.

11. The IP-PBX according to claim 10, wherein the IP-PBX further comprises a PSTN signal connecting unit which detects a call signal transmitted from PSTN and transmits the call signal to the H.323 gate keeper, or a call signal transmitted from the H.323 gate keeper and transmits the call signal to the PSTN.

12. The IP-PBX according to claim 11, wherein the PSTN signal connecting unit comprises:
a H.323 gate way which converts the protocol of the PSTN signal transmitted from the PSTN into the protocol of H.323 signal, or the protocol of H.323 signal into the protocol of the PSTN signal; and
an PSTN interface unit which processes transmitting signal or receiving signal between the H.323 gate way and the PSTN.

13. A call signal exchanging method of a private exchange based on internet phone, comprising the steps of:
detecting a call signal transmitted from a call transmitting terminal and determining protocol of the call;
matching the protocol of the call protocol with protocol of a call supported by a call receiving terminal when the protocol supported by the call transmitting terminal and the protocol supported by the receiving terminal are different; and
transmitting the call signal from the call transmitting terminal to the receiving terminal, wherein the call transmitting and the call receiving terminals are to he grouped into ring groups which receive call signal from a call transmitting terminal at the same time and ring.

14. The call signal exchanging method according to claim 13, wherein the call signal exchanging method further comprises the step of transmitting the call signal from the call transmitting terminal to the receiving terminal without converting the call signal when the protocol of the call from the call transmitting terminal is same the protocol supported by the call receiving terminal.

15. The call signal exchanging method according to claim 13, wherein the determining step further comprises the step of registering protocol type of the terminals into a memory.

16. The call signal exchanging method according to claim 15, wherein the matching step further comprises the step of registering protocol type of the terminals in a call converting unit, which correspond to the call transmitting and the call receiving terminals into the memory.

17. The call signal exchanging method according to claim 13, wherein the call transmitting and the call receiving terminals are terminals supporting H.323 protocol or property protocol.

18. A call signal exchanging method of a private exchange based on internet phone, comprising the steps of:
searching whether a first receiving terminal corresponding to a call signal is registered on a memory after being inputted the call signal received from a PSTN; and
transmitting the call signal to the first receiving terminal when the first receiving terminal is registered on the memory, and transmitting the call to the second terminals after converting the protocol supported by the second terminal into the protocol of the first terminal when the first receiving terminal groups a ring group with the second terminal supporting a different protocol.

* * * * *